April 4, 1950     E. N. ANKETELL     2,503,146
DISENGAGEABLE WORM GEARING
Filed Sept. 15, 1944     2 Sheets-Sheet 1
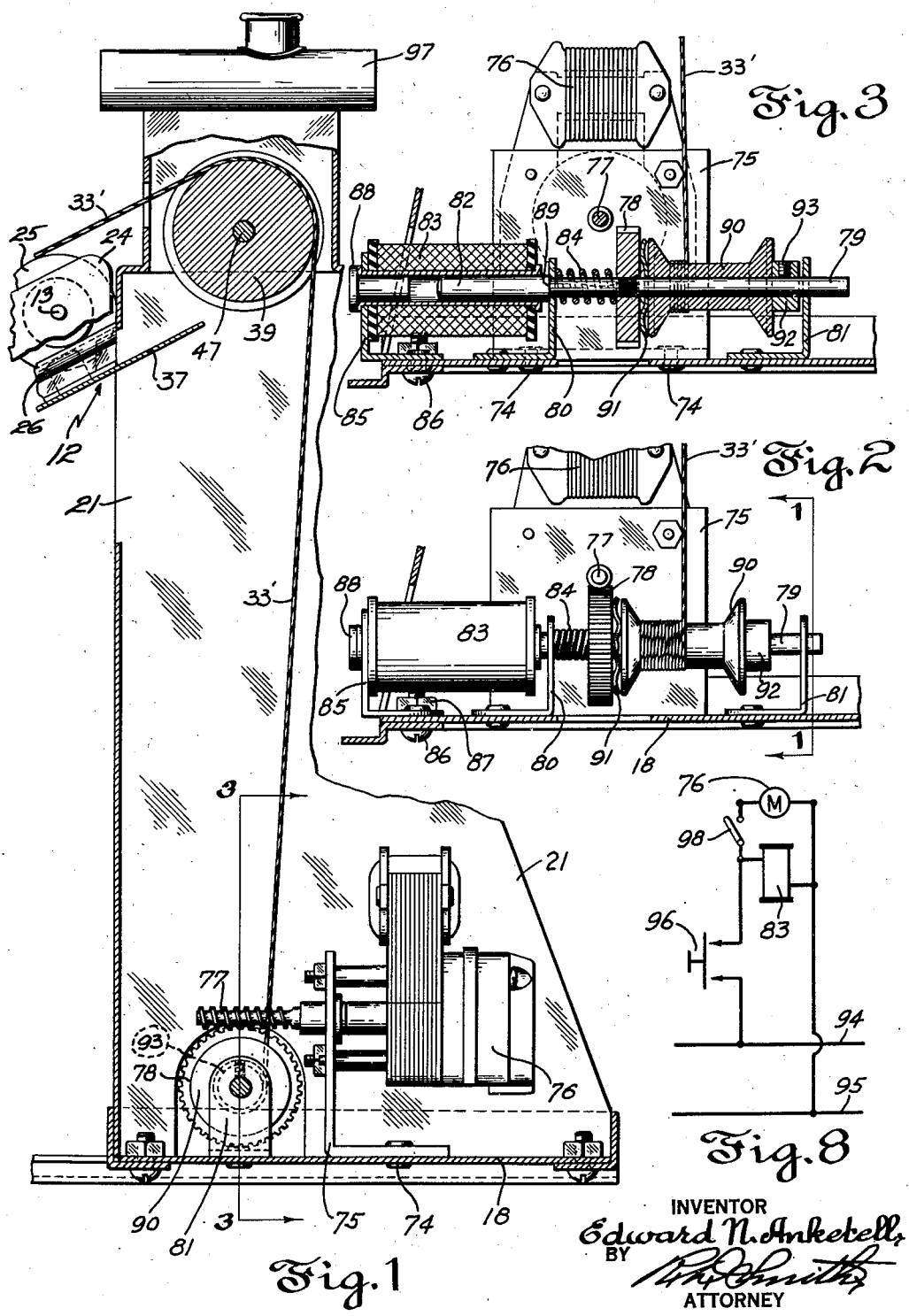
INVENTOR
Edward N. Anketell,
BY
ATTORNEY April 4, 1950 E. N. ANKETELL 2,503,146
DISENGAGEABLE WORM GEARING
Filed Sept. 15, 1944 2 Sheets-Sheet 2
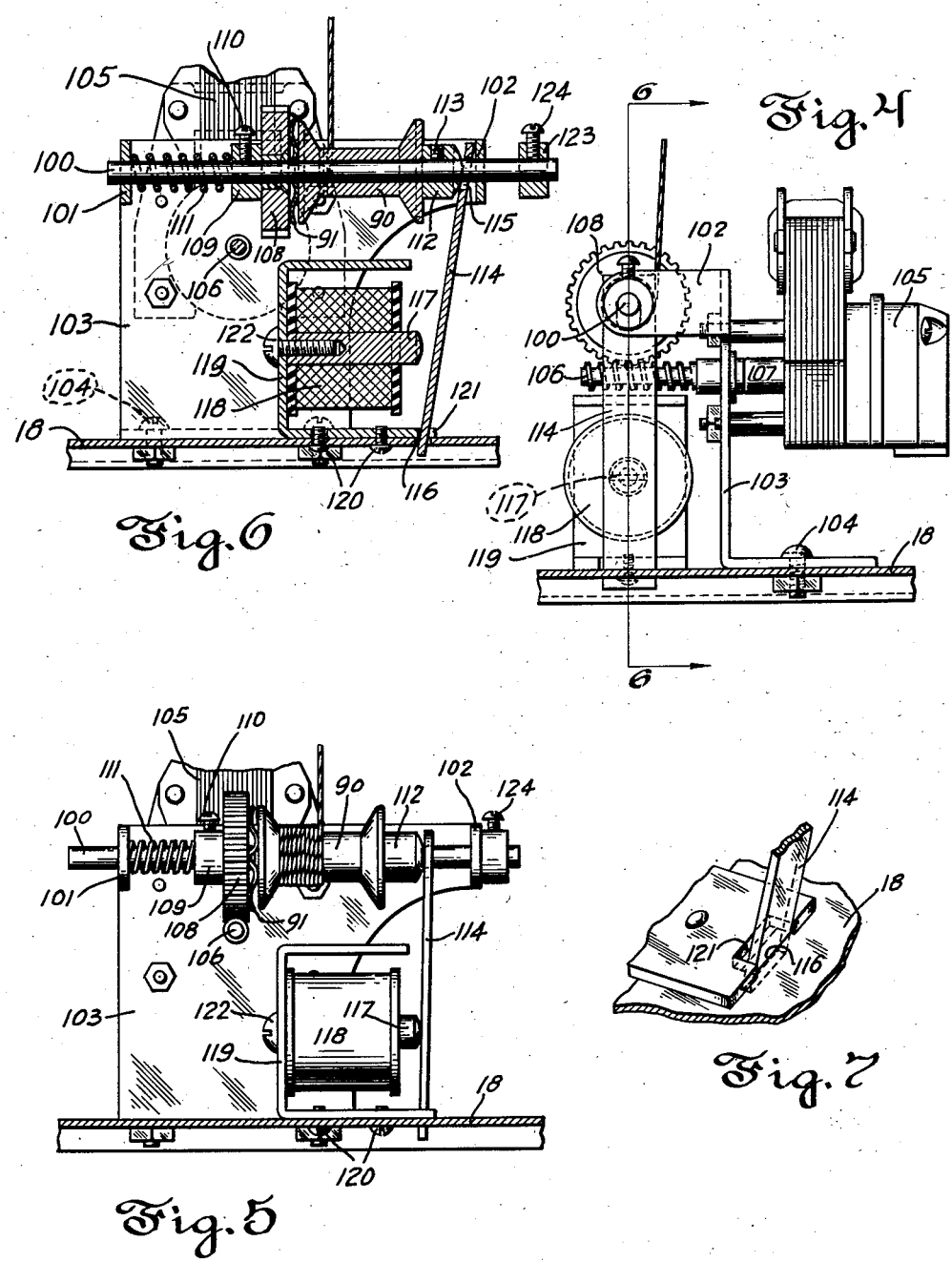
INVENTOR
Edward N. Anketell,
BY
ATTORNEY Patented Apr. 4, 1950

2,503,146

UNITED STATES PATENT OFFICE 2,503,146

DISENGAGEABLE WORM GEARING

Edward N. Anketell, New Haven, Conn., assignor to The A. C. Gilbert Company, New Haven, Conn., a corporation of Maryland Application September 15, 1944, Serial No. 554,288

4 Claims. (Cl. 74—405)

This invention relates to power driven cable reeling apparatus particularly for motivating toys of many types including toy crane apparatus such as is disclosed in a copending application, Serial No. 407,769, filed August 21, 1941 which eventuated in U. S. Patent No. 2,373,271 April 10, 1945.

The general object of the improvements herein claimed is to provide an electrically controlled and/or electrically powered prime mover for automatically pulling upon and releasing a flexible toy operating cable or cord at different desired times.

A further object is to incorporate a power disconnect clutch which shall operate automatically to prevent slippage between the disconnectable clutch members whether running or idle when the same are operatively engaged.

A still further object is to combine a slippable clutch and a non-slippable or toothed clutch in mechanical series relation in the power transmission from a motor to a load operating winch reel driven thereby for permitting without damage the overrunning of the power motor when rotation of the driven reel is checked and for diminishing shock and consequent breakage or excessive wear of the toothed clutch when the latter is engaged or disengaged under load.

Another object is to operate the power disconnect clutch by an electromagnet of simple and low cost construction suitable for a toy.

Another object is separately to control electrically, and preferably from a remote point, the energization of the power motor and the energization of the clutch shifting electromagnet.

Particulars concerning the foregoing and other objectives will appear in greater detail from the following description of preferred forms of the invention in which description reference is had to the accompanying drawings wherein:

Fig. 1 is a view showing a fragmentary portion of certain crane apparatus which may serve as framework for one form of power operated toy winch incorporating the present improvements.

Fig. 2 is a fragmentary view looking from the left at Fig. 1.

Fig. 3 is a fragmentary view taken in section on the plane 3—3 in Fig. 1 looking in the direction of the arrows.

Fig. 4 is a view similar to a portion of Fig. 1 showing a modification of the winch motivating mechanism.

Fig. 5 is a view looking from the left at Fig. 4.

Fig. 6 is a view taken in section on the plane 6—6 in Fig. 4 looking in the direction of the arrows.

Fig. 7 is a fragmentary perspective view showing a detail of construction of the armature of the electromagnet of Fig. 6.

Fig. 8 is a diagram of electrical connections.

A toy crane apparatus suitable to be powered by an electrically controlled toy winch mechanism incorporating the present improvements may include an elevated inclined runway 12 supported at its low end by structure disclosed more fully in the aforesaid copending application and supported at its high end by a standard 21. Such structure together with the said standard 21 upstands from a common base 18 which may be formed by a horizontal rectangular skeleton framework of sheet metal. The inclined runway 12 incorporates laterally spaced rails 26 on which rides a crane trolley 24 more fully disclosed in the aforesaid copending application and which has four traction wheels 25. Trolley 24 further includes a body frame which gives bearing to cross shafts, as 13, for the traction wheels. A flexible cord or cable-like element 33' for hauling trolley 24 up the incline is tied to the trolley and extends up the runway and passes over a pulley 39 rotatable on shaft 47 which is supported at a high point on standard 21. This standard may be hollow and composed of spaced side walls flanking opposite sides of pulley 39. Cord 33' after passing over pulley 39 extends downward and is attached to friction rotated spool 90 in a manner to be wound up on the latter and played off therefrom when spool 90 rotates in respectively opposite directions.

An electric motor 76 is mounted on frame bracket 75 secured to base 18 by rivets 74 having a shaft worm 77 adapted to serve as prime mover. A helical gear or worm wheel 78 fixed on a longitudinally slidable winch shaft 79 can be shifted into and out of mesh with worm 77 and thereby serves as a power transmission clutch, capable of establishing or disconnecting power drive from motor 76 to a winch shaft 79. This shaft is freely rotatably and slidable lengthwise in bearings in the spaced frame brackets 80 and 81. On the left end of shaft 79 in Fig. 3 there is shown to be fixedly carried a magnetic plunger 82 which is free to rotate and slide axially in the hollow core of solenoid 83. A coiled spring 84 is lengthwise under compression between gear 78 and bracket 80 and constantly urges shaft 79 toward the right in Figs. 2 and 3. Solenoid 83 is fixedly supported on a frame bracket 85 which is removably secured to base 18 by a screw 86 and has the left end of its core cavity plugged by the stop stud 88. Stud 88 allows a predetermined extent of movement for plunger 82 toward the left in Fig. 3 when solenoid 83 is electrically energized and draws shaft 79 toward the left against the yielding resistance of spring 84. This movement of shaft 79 throws gear 78 into mesh with worm 77 as shown in Fig. 2. A shoulder 89 at the junction of shaft 78 and plunger 82 abuts against bracket 80 and limits spring urged movement of shaft 79 and gear 78 toward the right to its position shown in Fig. 3.

Between gear 78 and bearing bracket 81 the aforesaid winding spool 90 is rotatable relative thereto on shaft 79. A friction washer 91 separates spool 90 from gear 78 and constantly urges the former toward the right in Figs. 2 and 3 and against a thrust collar 92 fixed to shaft 79 by set screw 93. Thus spool 90 is caused to be rotated yieldably by shaft 79 in either direction but slippage can always take place between this spool and shaft when the load on the spool becomes excessive.

The wiring diagram of Fig. 8 indicates that motor 76 and solenoid 83 may be connected electrically in shunt relationship to supply lines 94 and 95 through a common circuit making and breaking switch 96 which may be located at any convenient point remote from the toy. If desired switch 96 can be located near the usual electrical controller or controllers (not shown) which serve to make or break the circuit or circuits that feed the track rails of an electrified toy railroad shown in the aforesaid copending application.

Figs. 4 to 7, inclusive, show a different form of electrically controlled application of power for winding up the hauling cord 33' and playing it off as desired. In this modification, the winch shaft 100 is freely rotatable and freely slidable lengthwise in spaced arms 101 and 102 of bearing bracket 103 which bracket is fixedly mounted on base 18 by screws and nuts 104. Electric motor 105 also is mounted on bracket 103 and the latter affords bearing for a worm 106 axially aligned with and rotated by motor shaft 107. A helical or worm gear 108, similar to gear 78, is made fast to winch shaft 100 by means of its hub 109 and set screw 110. Spring 111 is coiled loosely about shaft 107 and is constantly under axial compression between bracket arm 101 and gear hub 109 thus acting constantly to urge gear 108 and shaft 107 toward the right in Figs. 5 and 6. A thrust collar 112 is made fast to winch shaft 107 by means of set screw 113. The limit of movement of collar 112 and shaft 107 toward the right is determined by the swayable electromagnetic armature bar 114 which intervenes between collar 112 and bracket arm 102. This armature bar has an elongated aperture 115 in its upper end permitting said end to have tilt permitting play relative to shaft 107. Thus shaft 107 passes freely through the armature bar and this bar is in effect somewhat loosely suspended from the shaft. The bottom end of armature bar 114 is slidably fulcrumed or loosely anchored in an aperture 116 in the base 18 so that a mean section of the length of bar 114 comes within the magnetic field of the projecting core plug 117 of a solenoid 118 mounted by means of screw 122 on stationary frame bracket 119. This bracket is secured to base 18 by screws 120 and may have a cutout 121 registering with aperture 116 to assist in providing a rugged pivotal anchorage for the lower end of armature bar 114 as best shown in Fig. 6. A stop collar 123 fixed on the extreme right end of winch shaft 100 by means of set screw 124 in Fig. 5 acts as a stop to limit the lengthwise movement of this shaft toward the left to a position wherein gear 108 is in mesh with worm 106.

Just as in Figs. 1 to 3, there is mounted on shaft 10 between gear 108 and thrust collar 112, a winding spool 90 which for emergency purposes is slippably rotatable with respect to shaft 100 by means of a friction washer 91 which separates spool 90 from gear 108 and constantly urges spool 90 toward the right in Figs. 5 and 6 and against thrust collar 112. Cord 33', after passing over pulley 39, extends downward and is attached to friction driven spool 90 in a manner to be wound up on and played off from the latter by rotation thereof in respectively opposite directions.

The same scheme of electrical connections as is indicated in Fig. 8 may be employed for the apparatus of Figs. 4 to 7, motor 105 taking the place of motor 76 and solenoid 118 taking the place of solenoid 83.

Referring to Fig. 8, in operating the crane and derrick apparatus by electrically controlled application of the power of electric motor 76, a remotely located switch 96 may be closed to begin the action. This simultaneously energizes motor 76 and the solenoid 83 resulting in worm 77 rotating at full speed and gear 78 being shifted toward the left from its position in Fig. 3 to its position in Fig. 2 as solenoid 83 draws magnetic plunger 82 further into its magnetic field against the resistance of spring 84. The helical teeth on gear 78 freely slide into mesh with the teeth of worm 77 even if the latter be rotating at high speed. As shaft 79 is drawn lengthwise toward the left in Fig. 3 the left extremity of plunger 82 encounters the stationary magnetic core plug 88 and rotates while remaining in contact therewith. Friction between plunger 82 and plug 88 is practically eliminated by cone-pointing the contacting end of plunger 82 as shown in Fig. 3. Gear 78 is now rotated clockwise in Fig. 1 at a reasonably slow speed whereby spool 90, yieldably impelled through the friction set up by washer 91, winds upon itself the cord 33'. At any point in the journey of trolley 24 up the runway, cord 33' may at will instantly be freed and permitted to play out as fast as the slack can be taken up by the coasting of trolley 24 down the runway. This is accomplished by merely opening switch 96 which instantly deenergizes solenoid 83 and permits spring 84 to shift gear 78 toward the right from its position in Fig. 2 to its position in Fig. 3. Thus the power drive is broken between gear 78 and worm 77, the latter immediately ceasing to rotate because motor 76 becomes deprived of current at the same time.

While spool 90 becomes free to rotate counterclockwise in Fig. 1 whenever switch 96 is opened so that this spool 90 plays off the cord 33' as fast as trolley 24 coasts down the runway 12, it will be understood that the frictional force due to spring 91, by means of which shaft 79 impels spool 90, is sufficiently great to pull trolley 24 up the runway 12 and hence is sufficiently great at all times to prevent trolley 24 from coasting down runway 12 unless shaft 79 is made free to turn by opening switch 96. If it is desired to hold the trolley stationary at a point up the runway, another switch 98 may be interposed in the circuit between solenoid 83 and motor 76 as indicated in Fig. 8 so that the motor may be stopped, if desired, without deenergizing solenoid 83. This will leave gear 78 locked stationary in mesh with non-rotating worm 77. Thereafter at will, the mere opening of switch 96 will disengage gear 78 from worm 77 and permit the trolley to coast down hill.

When in the motor impelled travel of trolley 24 up the runway 12, the trolley becomes arrested at the top of the incline because of encountering the upright wall of standard 21, the motor can continue to run, and worm 77 and gear 78 can continue to rotate, spool 90 standing still because unable to further wind up on cord 33' and slippage thereupon taking place between shaft 79 and spool 90. In this stalled condition of the trolley, the moment switch 98 is opened the motor will stop running and the trolley will be uneffected because gear 78 will remain interlocked with the non rotating worm 77. But the moment switch 96 is opened, gear 78, shaft 78 and spool 90 all in unison, become free to rotate and then the trolley coasts down the runway.

In Figs. 4 to 7, inclusive, the closing of switch 96 of Fig. 8 will be understood to energize motor 105 and solenoid 118 simultaneously which will immediately start worm 106 rotating and cause the electromagnetic core 117 to attract the armature 114 forcing the latter to swing from its position in Fig. 6 to its position in Fig. 5. This causes gear 108 to pass into mesh with worm 106 whether or not the latter is rotating and the stop collar 123 limits the travel of gear 108 toward the left to a proper position of mesh with the worm. Upon opening switch 96, spring 111 restores the parts to their positions in Fig. 6 disengaging gear 108 from worm 106. The axial distance between collar 112 and gear 108 may be the same as between collar 92 and gear 78 in Fig. 3 so that the same spool 90 and friction washer 91 may be employed as in the form of the power mechanism disclosed in Figs. 1 to 3.

The framework of the log loading apparatus may be embellished with suitable structural shape and surface coloring to imitate the appearance of an actual building, with its towers, platforms, etc. commonly seen in logging camps thereby to enhance the realism of the toy. As an example, the tower house 97 is represented atop the column 21 and concealing the pulley 39 so as to give the visual impression that all of the power mechanism is contained within the imitative house structure 97.

Many modifications of the particular forms and arrangement of parts herein disclosed to illustrate the invention will be suggested by this disclosure to workers in the art and the appended claims are directed to and intended to cover all fair equivalents and commonly known substitutes for any of the particular constructions and relationships of parts herein disclosed which fall within the broadest reasonable interpretation of the claim language.

I claim:

1. In a toy mechanism for transmitting power to a toy load, the combination of, a rotor adapted to motivate the toy load, a toy frame structure, a shaft carrying said rotor journaled for rotary and axial sliding movement in said frame, a gear wheel fixed on said shaft, a power worm, at least one electro-magnet, an armature bar suspended from said shaft in a manner to permit tilting of said bar relative to said shaft, an abutment on said shaft engageable by said armature bar for moving the shaft lengthwise to shift said gear wheel into mesh with said worm, and means affording a fulcrum for said bar at a distance from said shaft said bar being swingable about said fulcrum in the magnetic field of said solenoid thereby to be impelled magnetically for urging said shaft in an axial direction.

2. In a toy mechanism for transmitting power to a toy load, the combination of, a rotor adapted to motivate the toy load, a toy frame structure, a rotary shaft carrying said rotor journaled in said frame in a manner permitting said shaft to slide axially relative to said frame, a gear wheel fixed on said shaft, a power driven worm, actuating means including a spring and an electric solenoid for shifting said gear wheel in unison with said shaft into and out of mesh with said worm, a magnetically attractable plunger rigid with said shaft movable in unison with the shifting movement of the shaft in directions toward and away from the magnetic field of said solenoid, and a frame bearing giving rotary support to said shaft between said plunger and said gear wheel.

3. An electrically controlled power transmission for toys, comprising toy framework, a powered driving gear rotatably supported on said framework, spaced bearings stationed on said framework, a rotary shaft journaled to slide axially through said bearings spanning the space therebetween, a driven gear fixed on said shaft for axial movement in said space into and out of mesh with said driving gear, a toy motivating rotor relatively loose on said shaft in said space, clutch means in said space frictionally coupling said rotor to said driven gear, a magnetically attractable armature carried by said shaft extending outside said space, and a solenoid stationed outside said space on said framework in position to generate a magnetic field operative to motivate said armature and shaft in a manner to mesh and unmesh said gears.

4. An electrically controlled power transmission for toys, comprising toy framework, a powered driving gear rotatably supported on said framework, spaced bearings stationed on said framework, a rotary shaft journaled to slide axially through said bearings spanning the space therebetween, a driven gear fixed on said shaft for axial movement in said space into and out of mesh with said driving gear, a toy motivating rotor relatively loose on said shaft in said space, clutch means in said space frictionally coupling said rotor to said driven gear, a magnetically attractable armature carried by said shaft extending outside said space, and a solenoid stationed outside said space on said framework in position to generate a magnetic field operative to motivate said armature and shaft in a manner to mesh and unmesh said gears, together with a spring between said gear and one of said bearings biasing said shaft away from the last said bearing.

EDWARD N. ANKETELL.

REFERENCES CITED

The following references are of record in the file of this patent:

UNITED STATES PATENTS

| Number | Name | Date |
|---|---|---|
| 899,088 | Weichelt | Sept. 22, 1908 |
| 985,699 | Pearson et al. | Feb. 28, 1911 |
| 1,193,089 | Wagner et al. | Aug. 1, 1916 |
| 1,424,027 | Murphy | July 25, 1922 |
| 1,623,021 | Smaltz | Mar. 29, 1927 |
| 1,837,974 | Lillard et al. | Dec. 22, 1931 |
| 1,939,405 | Nardone | Dec. 12, 1933 |
| 2,343,684 | Mace | Mar. 7, 1944 |
| 2,373,271 | Smith | Apr. 10, 1945 |

FOREIGN PATENTS

| Number | Country | Date |
|---|---|---|
| 209,916 | Great Britain | Jan. 24, 1924 |